June 14, 1966   A. G. KOCH ETAL   3,256,131
EMBOSSED LAMINATE AND METHOD OF MAKING SAME
Filed Dec. 5, 1962
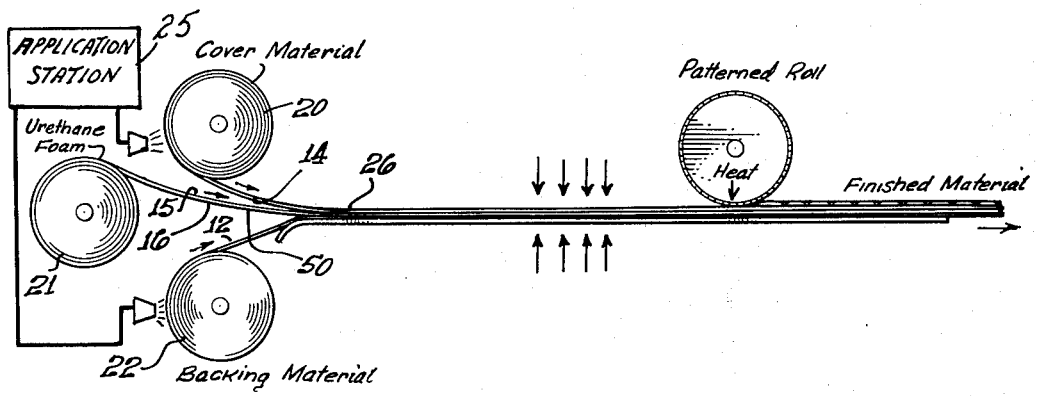
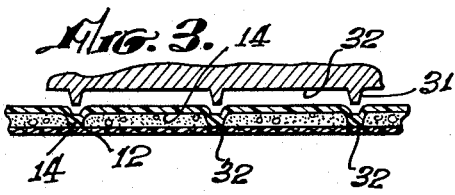
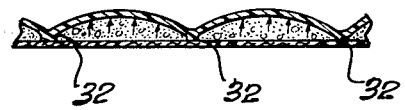
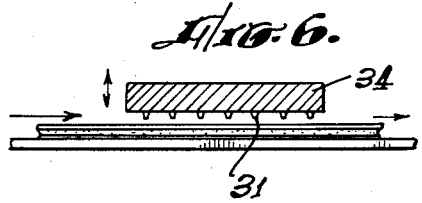
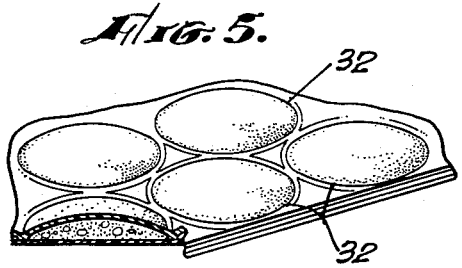
ALAN G. KOCH,
GEORGE T. KOCH,
INVENTORS.
By THEIR ATTORNEYS.
Spensley & Horn.

3,256,131
EMBOSSED LAMINATE AND METHOD OF MAKING SAME

Alan G. Koch, La Canada, and George T. Koch, La Habra, Calif., assignors to Fibremetal, Inc., La Canada, Calif., a corporation of California
Filed Dec. 5, 1962, Ser. No. 242,462
7 Claims. (Cl. 161—119)

This invention relates to the formation of laminated fabric materials and more particularly to an improved method for forming laminated materials which comprise a sheet of cover material such as fabric to which is adhered a layer of foamed plastic such as urethane foam.

Foamed plastics including vinyls, polyurethanes, cellulose acetates, polystyrenes, polyethylenes, phenolics, silicones and epoxies, have become increasingly used and developed. The various applications of such foamed plastics are extensive and well known. Foamed plastics fall into two broad classifications, the first being discrete or unicellular material and the other being continuous or interconnecting cellular material. The unicellular products are most generally made from chemical blowing agents which upon decomposition produce nitrogen. The continuous cellular foams are most generally made by the use of carbon dioxide or other gases or by incorporating a chemical blowing agent into a resin or rubber mix to form a gas by chemical reaction induced by heat, or by incorporating a specific poly-functional compound such as diisocyanate into a poly-functional resin which reacts to liberate a gas and also to cross-link the resultant foam into a rigid or flexible structure which has open or closed cells. It is with this continuous cellular type of foamed plastics that the present invention deals. The reaction of specific polyisocyanates with water to liberate gas is exemplified by the manufacture of urethane or isocyanate foam. The polyurethane foams are thus cellular materials prepared by the reaction of polyisocyanates, poly-functional resins, and water with or without additional blowing agents. In this system, the reaction of the polyisocyanate with water liberates carbon dioxide while simultaneously polymerizing and cross-linking the resin to entrap the liberated carbon dioxide. The density of the foams is therefore controlled by the amount of water, blowing agent and polyisocyanate used in the formulation. The urethane foams can be foamed in place and can be self-cured by the exothermic heat generated in the foaming reaction. Toluene diisocyanate is most often used in the production of polyurethane foams. This is used in conjunction with liquid or low melting poly-functional resins containing reactive groups such as hydroxyl and carboxyl groups. For rigid foams, a highly branched poly-functional resin is used while for flexible foams, a poly-functional resin having only a little branching is preferred. A number of poly-functional materials such as castor oils, glycols, drying oils, polyethers and polyesters have been utilized to prepare foam.

Tertiary amines are most often used to catalyze and control the reaction rates. Typical catalysts are N-methyl-, N-ethyl-, and N-coco-morpholine, as well as triethyldimethyl cyclohexyl and diethylethanolamine. Surfactants are often used in the formulations to improve homogeneity and control cell structure in the mixing operation. The densities of such foams vary from approximatedly 0.5 pound per cubic foot to in excess of 65 pounds per cubic foot and the cell structure diameter varies from microscopic to approximately one-half inch.

Laminated fabric materials such as those formed by utilizing a layer of cover material such as fabric or supported vinyl resin film (sometimes known as synthetic leather) to which is affixed a layer of foamed plastic or other filler materials are well known to the art. For example, supported vinyl resin film such as Naugahyde, a trademark for a supported vinyl made by the U.S. Rubber Company, is often stitched or sealed to a relatively thick layer of filler material such as foamed vinyl plastic or blown acetate to obtain panels or laminated fabric with an embossed design, such laminated fabrics are often found in upholstery and in car manufacture, for example, to form the panels for doors and seats. In the present state of the art, the most common method of manufacture is by utilizing the synthetic or plastic coated fabric with a layer of foam vinyl or other filler which is stitched in a desired pattern or is dielectrically heat sealed in the desired pattern. For example, to form a laminated fabric having a design thereon which design is similar to embossing, a typical method of the present state of the art is to utilize three layers of material. The first layer is plastic coated fabric such as supported vinyl resin film, the second layer is a slab of foam vinyl material or blown acetate approximately ¼ inch in thickness, while the third layer is a layer or sheet of backing material such as nylon. In the stitching method of forming the laminated material, the three layers are sewn together in a predetermined design, such that along the stitching line the three layers are pulled together with the foam compressed along the stitched line. The three layers are attached only along the stitched line and an embossed effect is obtained since where not stitched, the foam remains in the thicker condition. The dielectric heat sealing method of formation is similar in that the stitching operation is merely replaced by a heat seal operation which compresses the three layers of material together along the desired pattern line and causes them to be fused under heat and pressure. Fabrics and some materials require coating or treatment to receive a dielectric seal. In these methods of formation, it can be seen that the three layers of material are not attached to one another except along the stitching or heat sealing line. The amount of relief or embossing effect which can be obtained by these methods is limited since the thickness of the filler material which can be used and with which a good stitching operation or heat sealing operation can be effective is limited.

It is an object of the present invention to provide a laminated material in which a cover material is joined to a layer of filler material wherein the method of formation of the laminated material provides bonding of the cover material to the filler material over the entire area thereof.

It is an object of the present invention to provide a method for forming a laminated material by bonding a filler layer of flexible plastic foam to a cover layer of fabric or other flexible material.

It is another object of the present invention to provide an improved method of bonding a layer of flexible urethane filler material to a cover material wherein the filler material is bonded to the cover material efficiently, quickly and economically.

Yet another object of the present invention is to provide an improved method of forming a laminated material in which the material can be embossed in a predetermined pattern such that a filler layer of urethane foam is adhered to a layer of cover material throughout its area and not merely at the depressed lines forming the embossed pattern or design.

It is a further object of the present invention to provide such a method for forming laminated fabric material which is resistant to wear, and has a greater permanence in design formed thereon.

The present invention comprises the method of forming a composite material having a filler layer and a layer of cover material. In accordance with the present invention, anhydrous polyurethane foam forming materials are applied in liquid form to a contact surface of the layers to be laminated. Moisture is introduced into the anhydrous polyurethane foam forming material by heat and pattern forming pressure applied to the laminated layers. The application of heat and pressure causes the moisture to react with the foam and causes a bonding between the cover material and the filler layer.

In the drawing:

FIGURE 1 is a schematic view of the apparatus utilized to carry out the method of the present invention;

FIGURE 2 is a view in section of the three layers of material prior to the formation of the laminated material;

FIGURE 3 is a schematic view in section showing the apparatus utilized to apply the design pressure to the laminated material;

FIGURE 4 is a view similar to FIGURES 2 and 3 showing in section the laminated material after the three layers have been bonded in an embossed design;

FIGURE 5 is a view in perspective of an illustrative laminated material formed in accordance with the present invention; and, FIGURE 6 is a view in section of a modified form of the apparatus of FIGURE 1 utilizing a pattern plate rather than a pattern roller.

Referring now to the drawings, although the present invention is applicable to many types of processes and is adaptable for use in the formation of many kinds of laminated material, it has been found to be particularly advantageous in the formation of laminated materials having relief areas or an embossed effect. Although many materials and fabrics have been utilized as the cover material, the method is particularly effective in appearance when supported or unsupported vinyl is utilized as the cover material. Accordingly, the present invention will be described in connection with the formation of an embossed panel using supported vinyl resin film as the cover layer and a sheet of foamed urethane as the filler layer or interlayer.

These types of panels or laminated fabrics are particularly useful in the art of upholstery and in the formation of decorative upholstery fabrics and panels such as those employed as the inner surface of automobile doors, seats, and the like. Although a backing material is not essential to the present invention, it is advantageous and the laminated material of the present invention will be described utilizing such a backing material. Accordingly, referring to FIGURE 2, an illustrative composite material in accordance with the present invention comprises a sheet of supported vinyl resin film as the cover material 10, a filler layer 11 of flexible foam polyurethane, which is, for example, ¹⁄₁₆ to ½ inch in thickness, and a backing material such as a nylon fabric 12.

In general, four constituents of polyurethane foam are considered and described hereinafter. The first is the poly-functional resin containing two or more hydroxyl groups per molecule. The second is the reacting agent, or polyisocyanate which serves to cross-link the final polymer and react with the water. The third constituent is a catalyst which is utilized when necessary. The fourth is water, water vapor, moisture or other substance which reacts with the polyisocyanate reacting compound to complete the foaming reaction. Referring now to FIGURES 1 and 2, it has been found by means of the present invention that the layer 11 of flexible foamed polyurethane can be adhered to the cover material 10 and the backing material 12 by applying to the contact surface of the cover material and urethane foam an anhydrous mixture of the poly-functional resin materials and polyisocyanate.

In accordance with the present invention, the poly-functional resin, e.g., polyester or polyether, is mixed with the polyisocyanate reacting compound and heated in a manner well known to the art to form a prepolymer which, when combined with water, will cross-link and liberate gas. The prepolymer is mixed in anhydrous condition and applied as a film of material at an application station. In addition to the prepolymer, as discussed more fully hereinafter, a catalyst can be added to control the rate of reaction and the cell structure; such catalysts are well known to the art.

Thus, prior to application in the apparatus shown in FIGURE 1, the poly-functional resin and polyisocyanate are mixed to form an anhydrous prepolymer. This mixture is liquid in form and can be applied to the lower surface 14 of the cover material, to the upper surface of the filler layer 15, to the lower surface 16 of the filler material, or to the backing material 12. The prepolymer can be applied by any one of conventional methods such as being sprayed on the desired surface, brushed, roller coated, doctor bladed or any combination of such application methods. The thickness of the film to be applied to the surface will be determined by various parameters, but is essentially only a coat sufficient in thickness to wet the top surfaces of the cell walls at the surface of the foam layer. Subsequent to the application of the prepolymer film at the application station 25, heat and moisture sufficient to cause the foaming reaction are applied to the film. When the film is subjected to the moisture and heat, the prepolymer will foam to some extent and will cause a bonding between the filler layer 11 of foamed urethane and the layer of cover material 14 and backing material 12. The moisture introduced to the prepolymer to cause the diffusion reaction can be brought to the prepolymer by a separate application of moisture such as by spraying or can be extracted from moisture carried by the backing material or by the fabric portion of the cover material or the foam interlayer. When foaming of the prepolymer occurs, it causes only sufficient foaming to form a bonding layer which extends downward into the cells of the foam layer 11 which open to the upper surface to form a bond with the cell walls.

Referring now to FIGURE 1, in accordance with a specific example of the method of the present invention, the cover material, the urethane foam filler material, and the backing material are layered into a laminated sandwich as, for example, by positioning each of the layers on rolls and causing the three materials to be pulled from the rolls uniformly and fed along a path in contact one with the other. Thus, a roll of cover material 20, a roll of urethane foam 21 and a roll of backing material 22 are positioned as shown in FIGURE 1. At an application station 25, the prepolymer with a catalyst is applied to the upper surface 15 and the lower surface of the urethane foam filler layer 11 prior to the combining station 26 at which the layers are put into contact with one another. The prepolymer in this specific embodiment is a poly-functional resin comprising castor oil in the ratio 46.4 parts by weight and polyethylene glycol having a molecular weight of 200 at 4.7 parts by weight. The resin and polyisocyanate, which is tolylene diisocyanate in this embodiment, are mixed causing an exothermic reaction which is allowed to proceed to produce the prepolymer. Prior to the application station, a suitable catalyst which is N,N,N',N'-tetramethyl-1,3-butanediamine in this embodiment is mixed with the prepolymer at the ratio of 100:2. A catalyst is used in the presently preferred embodiment in order to control the rate of reaction and cell structure of the bonding layer by causing the foaming reaction to proceed with better control than would occur without the use of the catalyst.

Referring now to FIGURE 1, the source of the combined propolymer with catalyst is shown schematically as an application station 25 at which point the anhydrous prepolymer and catalyst combined are coated onto the upper 15 and lower 16 surface of the filler layer 11. It is necessary to apply heat and moisture to the bonding film in order to cause the bonding to occur by reason of a foaming reaction in the bonding layer. The moisture required is minimal and can be introduced by many means. In the presently preferred embodiment, moisture is introduced to the prepolymer film by conditioning the fabric backing of the cover material by spraying moisture thereon. Heat is then applied at the heating station 27. This heat causes the moisture to be driven from the fabric backing, thus supplying both the heat and moisture for the reaction. Additionally, the pattern roller 30 is heated to a temperature of approximately 200° to 400° F. to complete the foaming reaction of the bonding layer and to cure the resultant foam which has by the reaction bonded to the cover material and to the layer of urethane foam 10. The temperature to which the roller is heated is determined by the material used as the cover material and is determined primarily by the temperature to which the material can be heated without harm. Thus, 200° F. is illustrative of the temperature when vinyl resin film is used while a temperature of 400° F. may be used when cloth fabric is used. The bonding of the foamed bonding material to the filler layer 11 is particularly strong in that due to the foaming reaction the bonding material progresses downwardly into the urethane foam filler and bonds with the cell walls which are open at the surface. As shown particularly in FIGURE 3, the pattern roller 30 has a series of circumferential protrusions which when laid out to a planar pattern correspond to the pattern being impressed or embossed on the laminated material. Thus, in FIGURE 3, the protrusions 31 extend downwardly to the surface 32 of the pattern roller by a distance substantially equal to the thickness of the laminated materials 10, 11 and 12 so that when the pattern roll is placed on the laminated material it brings the lower surface 14 of the cover material substantially into contact with the upper surface of the backing material 12 at points indicated as 32 in FIGURES 3 and 4. At these points, the cover material is bonded to the backing material. Although these bonding points are shown as single points in the sectional views of FIGURES 3 and 4, it is understood that they are lines describing a pattern in the laminated material as indicated in FIGURE 5. Over the remainder of the surfaces of the laminated materials, bonding also takes place such that the entire lower surface 14 of the cover material 10 is bonded to the upper surface of the filler material 11 which is, in turn, bonded at its lower surface to the backing material 12.

In FIGURE 6, there is shown a modified form of the apparatus of FIGURE 1 employing a flat vertically movable press 34 which has protrusions 31 extending from its lower surface comparable to those of the pattern roller in the previously described embodiment. It can be seen from the foregoing description that the flat pattern press 34 of FIGURE 6 can be utilized to impress the pattern on the laminated materials as well as many other various types of apparatus.

In an alternative embodiment of the present invention, it has been found that in some instances it is advantageous to utilize a catalyst by applying the catalyst to the laminated materials subsequent to the application of the prepolymer. In accordance with this embodiment of the present invention, the prepolymer without catalyst is applied as previously described at the application station by roller coating, spraying or other methods known to the art. Subsequently and at a point in the apparatus indicated as 50 in FIGURE 1, the catalyst with or without moisture is applied to the prepolymer coating on materials to come in contact with the coating. The catalyst may be sprayed or otherwise applied. By applying the catalyst in a step subsequent to the application of the prepolymer, a greater degree of control of the foaming reaction is acquired in that a minimum of foaming reaction takes place until both the catalyst and moisture are applied. This prevents premature foaming due to moisture in the ambient. Consequently, a longer life of the coating equipment is obtained and fewer complications of control are incurred. The catalyst can be anhydrous or can contain a predetermined amount of moisture to speed the foaming reaction.

In addition to the previously described advantages of the method of the present invention, it should be pointed out that the gas liberated by the foaming reaction of the bonding layer tends to push the cover material the maximum distance away from the backing material to give a depth of pattern not heretofore possible. Also, since the heat required to cause the foaming reaction is not nearly so great as that employed in heat sealing operation, the pattern on the outer surface of the cover material such as a synthetic leather appearance is not damaged. That is, when heat sealing is employed, the upper surface of the cover material is sometimes flattened and glazed by the heat and pressure exerted on the surface.

Although the present invention has been described with supported vinyl as a cover material, cloth and other fabrics may also be employed and the pattern depression in the laminated materials can be depressed from both sides of the laminated material. Additionally, a rigid material such as plywood can be utilized as the backing layer to form rigid laminated panels. Further, although the present invention has been described utilizing a backing material and with thicknesses of the filler material of from 1/16 to 1/2 inch, greater thicknesses can be utilized and the backing material can be omitted. For example, it has been found that by the method of the present invention a permanent embossing effect is obtained in a cushion, for example, when the cover material is bonded to a foamed plastic cushion of any thickness by the method of the present invention.

What is claimed is:

1. A laminated fabric comprising: a first layer of cover material, a second layer of flexible foamed urethane sheet material of substantial thickness adjacent said first layer, a third layer of backing material adjacent said second layer at the surface thereof opposite said first layer, and a bonding layer of foamed-in-place urethane plastic bonding said first to said second layer and said second to said third layer over substantially the entire surface area thereof.

2. A laminated fabric in accordance with claim 1 in which said cover material is vinyl resin film.

3. A laminated fabric in accordance with claim 1 in which said cover material is cloth fabric.

4. An embossed laminated fabric comprising a first layer of cover material, a second layer of flexible foamed urethane sheet material of substantial thickness, a third layer of backing material, said second layer being positioned between and in contact with said first and third layers, said first and second layers and second and third layers being bonded together by foamed-in-place urethane plastic, said first layer being bonded substantially into contact with said third layer in a predetermined embossed pattern.

5. The method of forming a laminated fabric having a first layer of cover material and a second layer of filler material in contact with said first layer comprising: applying a film of anhydrous polyurethane foam forming materials on a contact surface between said first and second layers, bringing said first and second layers into surface contact one with the other, introducing moisture to said anhydrous film sufficient to cause foaming reaction of said polyurethane materials whereby said first and second layers are bonded.

6. The method of forming an embossed laminated fabric having a first layer of cover material, a second layer of filler material and a third layer of cover material with said second layer juxtaposed between said first and third layers comprising: applying a film of anhydrous polyurethane foam forming materials on the contact surfaces between said first and second layers and second and third layers; bringing said first and second layers into surface contact and said second and third layers into surface contact; applying heat and pressure over a portion of the exterior surface area of said first layer whereby portions of said first layer are depressed into substantial contact with said third layer; and, introducing moisture into said anhydrous films sufficient to cause foaming reaction of said polyurethane materials whereby said layers are bonded one to the other.

7. The method of forming an embossed laminated fabric having a first layer of cover material and a second layer of filler material adjacent said first layer comprising: applying a film of anhydrous polyurethane foam forming materials on a contact surface between said first and second layers, bringing said first and second layers into contact with said film therebetween, introducing moisture to said anhydrous film sufficient to cause foaming reaction of said polyurethane materials, applying heat and pressure to said first layer, said heat being sufficient to cure said polyurethane material, said pressure being in a predetermined pattern on the outer surface of said first layer sufficient to depress said second layer in a desired pattern of depressions.

References Cited by the Examiner

UNITED STATES PATENTS

| | | | |
|---|---|---|---|
| 2,287,159 | 6/1942 | Zinser | 161—73 |
| 2,373,194 | 4/1945 | Luttge | 161—73 |
| 2,404,073 | 7/1946 | Karfiol et al. | 156—209 |
| 2,621,138 | 12/1952 | Messing | 156—209 |
| 2,766,164 | 10/1956 | Salem. | |
| 2,905,582 | 9/1959 | Coleman et al. | |
| 2,973,295 | 2/1961 | Rodgers | 161—121 |
| 2,981,637 | 4/1961 | Spencer et al. | |
| 2,983,636 | 5/1961 | Runton | 161—137 XR |
| 3,046,173 | 7/1962 | Copeland | 161—73 |
| 3,061,475 | 10/1962 | Wallace | 117—155 |
| 3,093,525 | 6/1963 | Wilson et al. | 156—79 |
| 3,170,832 | 2/1965 | Wilson et al. | 161—119 |

FOREIGN PATENTS 821,537   10/1959   Great Britain.

EARL M. BERGERT, *Primary Examiner.*

H. F. EPSTEIN, *Assistant Examiner.*